United States Patent
Tomei et al.

(10) Patent No.: US 8,530,581 B2
(45) Date of Patent: Sep. 10, 2013

(54) POWDER, COMPOSITIONS THEREOF, PROCESSES FOR MAKING THE SAME, AND ARTICLES MADE THEREFROM

(71) Applicant: ExxonMobil Chemical Patents Inc., Baytown, TX (US)

(72) Inventors: Joseph M. Tomei, Akron, OH (US); Daniel J. Collins, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/679,404

(22) Filed: Nov. 16, 2012

(65) Prior Publication Data

US 2013/0149478 A1    Jun. 13, 2013

Related U.S. Application Data

(60) Provisional application No. 61/569,660, filed on Dec. 12, 2011.

(51) Int. Cl.
*C08L 23/00* (2006.01)
*C08L 23/04* (2006.01)

(52) U.S. Cl.
USPC .......... 525/240; 525/191; 525/192; 525/196; 525/232; 428/500

(58) Field of Classification Search
USPC .......... 525/191, 192, 196, 232, 240; 428/500
See application file for complete search history.

(56) References Cited

U.S. PATENT DOCUMENTS

| | | | |
|---|---|---|---|
| 4,822,546 A | 4/1989 | Lohkamp | |
| 5,290,886 A | 3/1994 | Ellul | |
| 5,397,832 A | 3/1995 | Ellul | |
| 5,585,431 A * | 12/1996 | Igarashi et al. | 524/425 |
| 5,597,586 A | 1/1997 | Wilson et al. | |
| 5,741,563 A | 4/1998 | Mehta et al. | |
| 6,342,566 B2 | 1/2002 | Burkhardt et al. | |
| 6,384,142 B1 | 5/2002 | Burkhardt et al. | |
| 7,404,580 B2 | 7/2008 | Michael | |
| 7,803,876 B2 | 9/2010 | Yeh et al. | |
| 7,833,460 B2 | 11/2010 | Lobson | |
| 8,013,069 B2 | 9/2011 | Harrington et al. | |
| 2004/0164457 A1 | 8/2004 | Rogers et al. | |
| 2009/0121372 A1 | 5/2009 | Campbell et al. | |

FOREIGN PATENT DOCUMENTS

| | | |
|---|---|---|
| WO | WO 97/19991 | 6/1997 |
| WO | WO 97/44391 | 11/1997 |
| WO | WO 03/040201 | 5/2003 |
| WO | WO 03/074390 | 9/2003 |
| WO | WO 2004/081108 | 9/2004 |
| WO | WO 2009/082463 | 7/2009 |
| WO | WO 2011/022280 | 2/2011 |
| WO | WO 2012/050666 | 4/2012 |

\* cited by examiner

*Primary Examiner* — Michael C Miggins

(57) ABSTRACT

Provided herein is a powder comprising at least one of: (a) a propylene-based elastomer comprising, based on the total weight of said propylene-based elastomer, (i) at least about 60 wt % of propylene-derived units, (ii) about 5 wt % to about 35 wt % of units derived from at least one of ethylene and a $C_4$-$C_{10}$ alpha-olefin, and said propylene-based elastomer having a heat of fusion, as determined by DSC, of about 75 J/g or less; and (b) a polyolefin-based elastomer having a Shore A hardness, as determined by ISO 868, of less than 95; wherein the powder has an average particle size of from about 30 μm to about 850 μm. The powder is useful for rotational molding and for making articles having unique combination of elasticity, flexibility, and toughness.

24 Claims, 1 Drawing Sheet

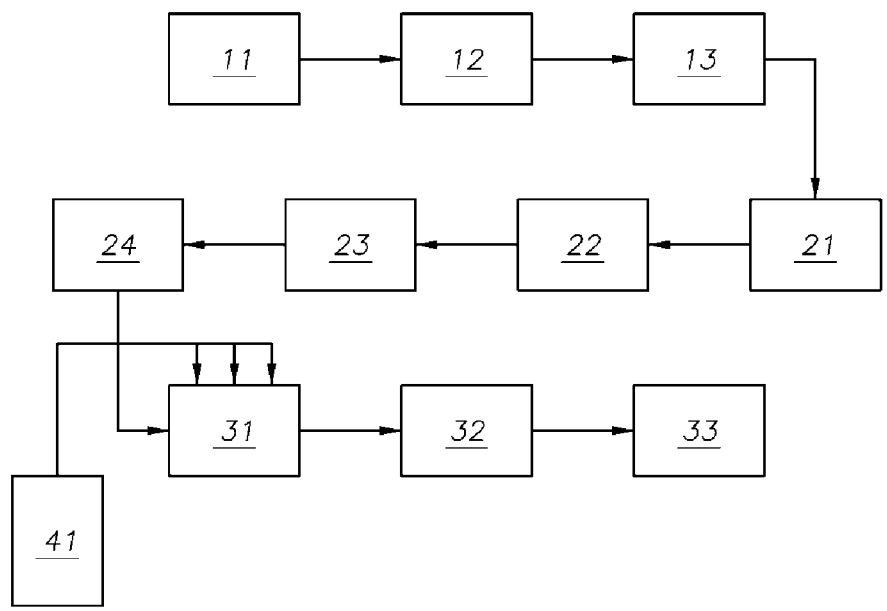

POWDER, COMPOSITIONS THEREOF, PROCESSES FOR MAKING THE SAME, AND ARTICLES MADE THEREFROM

CROSS REFERENCE TO RELATED APPLICATIONS

This application claims the priority and benefit of U.S. Ser. No. 61/569,660, filed Dec. 12, 2011, the disclosure of which is incorporated herein by reference in its entirety.

TECHNICAL FIELD

The present invention relates to a powder (in particular, a powder suitable for rotational molding), compositions comprising the powder, processes for making the same, and to articles made therefrom.

BACKGROUND IN THE ART

Rotational molding, also known as rotomolding, is a molding process for creating many kinds of articles having mostly hollow components and typically made of plastic. Generally, a rotomolding process requires pulverized thermoplastic material to facilitate is proper melting of the material in a rotomold. For the pulverization process, a harder material is preferred because a softer material is difficult to pulverize or ground by standard processes. Therefore, materials for rotomolding are predominantly from the polyethylene family, for example, cross-linked polyethylene, low density polyethylene, linear low density polyethylene, high density polyethylene, and some other materials such as polyvinylchloride (PVC), platisols, nylons, and propylene.

Polyolefin-based elastomers, especially propylene-based elastomers, can be advantageously used in some applications, for example, articles having hollow components, including toys, cushion seats, recreational balls, pillows, and slides, because of the unique combination of elasticity, flexibility, and toughness from polyolefin-based elastomers. However, experience in rotomolding with pellets of propylene-based elastomers shows that voids and bubbles often appear in the rotomolded components.

There is a need for compositions of polyolefin-based elastomers, in particular propylene-based elastomers, in rotomolding, with improved properties to achieve good performance in elasticity, flexibility, and toughness.

SUMMARY OF THE INVENTION

Provided herein is a powder comprising at least one of: (a) a propylene-based elastomer comprising, based on the total weight of said propylene-based elastomer, (i) at least about 60 wt % of propylene-derived units, (ii) about 5 wt % to about 35 wt % of units derived from at least one of ethylene and a $C_4$-$C_{10}$ alpha-olefin, wherein said propylene-based elastomer has a heat of fusion, as determined by DSC, of about 75 J/g or less; and (b) a polyolefin-based elastomer having a Shore A hardness, as determined by ISO 868, of from about 10 to about 95; wherein said powder has an average particle size of from about 30 µm to about 850 µm.

In one or more embodiments, the powder may further comprise at least one of: (a) a $C_2$-$C_{10}$ polyolefin; and (b) a carbon black, talc, calcium carbonate, calcium stearate, zinc stearate, lead stearate, magnesium stearate, aluminum stearate, or combinations thereof.

Also provided herein are compositions comprising the powder. In one or more embodiments, the composition may further comprise at least one of (c) a $C_2$-$C_{10}$ polyolefin and (d) a carbon black, talc, calcium carbonate, calcium stearate, zinc stearate, lead stearate, magnesium stearate, aluminum stearate, or combinations thereof. In one or more embodiments, the composition has an average particle size of about 30 µm to about 850 µm.

Also provided herein is a process for preparing the powder. The process may comprise the steps of: (a) providing a composition comprising at least one of: (i) a is propylene-based elastomer comprising, based on the total weight of said propylene-based elastomer, (1-a) at least about 60 wt % of propylene-derived units, (1-b) about 5 wt % to about 35 wt % of units derived from at least one of ethylene or a $C_4$-$C_{10}$ alpha-olefin, said propylene-based elastomer having a heat of fusion, as determined by DSC, of about 75 J/g or less; and (ii) a polyolefin-based elastomer having a Shore A hardness, as determined by ISO 868, of from about 10 to about 95; and (b) forming a powder from the composition, wherein said powder has an average particle size of about 30 µm to about 850 µm. In one or more embodiments, step (b) of the process comprises cryogenic grinding.

Also provided herein is a process for preparing a powder comprising the steps of: (a) providing a composition comprising at least one of: (i) a propylene-based elastomer comprising, based on the total weight of said propylene-based elastomer, (1-a) at least about 60 wt % of propylene-derived units, (1-b) about 5 wt % to about 35 wt % of units derived from at least one of ethylene or a $C_4$-$C_{10}$ alpha-olefin, said propylene-based elastomer having a heat of fusion, as determined by DSC, of about 75 J/g or less; and (ii) a polyolefin-based elastomer having a Shore A hardness, as determined by ISO 868, of from about 10 to about 95; and (b) cryogenically grinding the composition into a powder.

Also provided herein is a process for preparing a composition comprising the steps of: (a) providing a powder as described above; and (b) forming the composition by combining the powder with at least one of: (i) a $C_2$-$C_{10}$ polyolefin; and (ii) a carbon black, talc, calcium carbonate, calcium stearate, zinc stearate, lead stearate, magnesium stearate, aluminum stearate, or combinations thereof.

Also provided herein are articles made from the above-described powders and/or compositions. In one or more embodiments, the article comprises a hollow component. The article can be made by, for example, subjecting the powders or the compositions of the present invention to a rotational molding.

By integrating improved powders or compositions of the present invention with processing techniques, such as rotational molding, articles with improved properties including elasticity, flexibility, and toughness can be made. Such articles include those comprising hollow components or sub-components, for example, toys, cushion seats, pillows, slides, benches, recreational balls, dolls, bottles, tanks, and boxes, etc.

BRIEF DESCRIPTION OF THE FIGURES

FIG. 1 illustrates an exemplary embodiment of a process for making an embodiment of the present invention.

DETAILED DESCRIPTION OF THE INVENTION

Each of the inventions will now be described in greater detail, including specific embodiments, versions, and examples, but the inventions are not limited to these embodiments, versions, or examples, which are included to enable a person having ordinary skill in the art to make and use the inventions, when the information in this patent is combined with available information and technology.

Described herein are powders comprising a polyolefin-based elastomer and optionally a $C_2$-$C_{10}$ polyolefin, and/or fillers, and/or additives. As used herein, a "powder" compromises particles having a particle size of less than 1000 μm; preferably, the powders comprise particles having an average particle size of less than 1000 μm. Also provided herein are compositions, which may comprise a powder and, optionally, additional $C_2$-$C_{10}$ polyolefin, and/or fillers, and/or additives.

Polyolefin-Based Elastomer

As used herein, the term "polyolefin-based elastomer" means a polymeric elastomer made up of at least 50 wt % olefin derived units, examples of which include ethylene and $C_3$ to $C_{16}$ alpha-olefins, and combinations thereof. Examples of the olefin include ethylene, propylene, 1-butene, isobutylene, 2-butene, cyclobutene, 1-pentene, 1-hexene, 4-methyl-1-pentene, 1-octene, 3-methyl-1-butene, 4-methyl-1-butene, cyclopentene, 1-hexene, cyclohexene, 1-octene, 1-decene, 1-dodecene, and so on. These may be used singly or in combinations of two or more kinds thereof. In some embodiments, the polyolefin-based elastomers may comprise at least 50 wt % of ethylene, or propylene, or butene-derived units.

The polyolefin-based elastomer may be a random copolymer (the comonomer-derived units are randomly distributed along the polymer backbone), a block copolymer (the comonomer-derived units occur along long sequences), or any variation thereof. The presence of randomness or "blocky-ness" in a copolymer can be determined by $^{13}C$ NMR as is known in the art and described in, for example, "Evidence for Ethylene-Propylene Block Copolymer Formation," Journal of Polymer Science: Polymer Letters Edition, Vol. 18, Issue 5, pp. 389-394 (1980).

The polyolefin-based elastomer may have a Shore A hardness of from a lower limit of about 10, about 20, about 30, about 40, about 50, or about 60 to an upper limit of about 95, about 90, about 85, about 80, about 75, or about 70. Shore A hardness can be determined by ISO 868.

The polyolefin-based elastomers may have an MFR, as determined by ASTM is D1238 at 230° C. and 2.16 kg weight, of greater than about 0.1 g/10 min, about 0.5 g/10 min, about 1 g/10 min, about 5 g/10 min, or about 10 g/10 min, and preferably up to about 200 g/10 min, about 100 g/10 min, about 80 g/10 min, or about 40 g/10 min.

The polyolefin-based elastomers may have an elongation at break, as determined by ASTM D412, of at least about 100%, at least about 200%, at least about 300%, and may be up to about 1000% or about 2000%, and preferably in the range of from about 100% to about 2000%.

The polyolefin-based elastomers may have a density, as determined by ASTM D-792, of from about 0.83 g/cm$^3$ to about 0.9 g/cm$^3$, preferably from about 0.85 g/cm$^3$ to about 0.89 g/cm$^3$, from about 0.85 g/cm$^3$ to about 0.88 g/cm$^3$, or from about 0.85 g/cm$^3$ to about 0.87 g/cm$^3$.

The polyolefin-based elastomers may have a flexural modulus at 1% Secant (73° F.), as determined by ASTM D-790, of from about 10 MPa to about 100 MPa.

Other useful polyolefin-based elastomers include ethylene-based elastomers having, in addition to a Shore A hardness of from about 10 to about 95, one or more of the following properties:

(1) ethylene content of about 60 wt % to about 90 wt %, preferably about 65 wt % to about 85 wt %, preferably about 65 wt % to about 80 wt %, preferably about 65 wt % to about 75 wt %;

(2) ethylene content of about 80 mol % to about 96 mol %, preferably about 82 mol % to about 92 mol %, preferably about 82 mol % to about 88 mol %, preferably about 84 mol % to about 86 mol %;

(3) propylene content of about 10 wt % to about 20 wt %;

(4) butene-1 content of about 15 wt % or more, preferably about 20 wt % or more, preferably about 25 wt % or more;

(5) hexene-1 content of about 20 wt % or more, preferably about 25 wt % or more, preferably about 30 wt % or more;

(6) octene-1 content of about 25 wt % or more, preferably about 30 wt % or more, preferably about 35 wt % or more;

(7) density of about 0.9 g/cm$^3$ or less, preferably 0.89 g/cm$^3$ or less, preferably 0.88 g/cm$^3$ or less, preferably 0.87 g/cm$^3$ or less, preferably 0.86 g/cm$^3$ or less, preferably 0.83 g/cm$^3$ or more, preferably 0.84 g/cm$^3$ or more, preferably 0.85 g/cm$^3$ or more, preferably 0.855 g/cm$^3$ or more, preferably about 0.83 g/cm$^3$ to about 0.9 g/cm$^3$, preferably from about is 0.85 g/cm$^3$ to about 0.89 g/cm$^3$, preferably from about 0.85 g/cm$^3$ to about 0.88 g/cm$^3$, or preferably from about 0.85 g/cm$^3$ to about 0.87 g/cm$^3$;

(8) heat of fusion (Hf) of about 90 J/g or less, preferably about 70 J/g or less, preferably about 50 J/g or less, preferably about 30 J/g or less, preferably about 10 J/g to 70 J/g, preferably about 10 J/g to about 50 J/g, preferably about 10 J/g to about 30 J/g;

(9) crystallinity of about 40% or less, preferably about 30% or less, preferably about 20% or less, and at least about 5%, preferably about 5% to about 30%, preferably about 5% to about 20%;

(10) melting point (Tm, peak first melt) of about 100° C. or less, preferably about 90° C. or less, preferably about 80° C. or less, preferably about 70° C. or less, preferably about 60° C. or less, preferably about 50° C. or less;

(11) crystallization temperature (Tc, peak) of about 90° C. or less, preferably about 80° C. or less, preferably about 70° C. or less, preferably about 60° C. or less, preferably about 50° C. or less, preferably about 40° C. or less;

(12) glass transition temperature (Tg) of about −20° C. or less, preferably about −30° C. or less, preferably about −40° C. or less;

(13) Mw of about 30 kg/mol to about 2,000 kg/mol, preferably about 50 kg/mol to about 1,000 kg/mol, preferably about 90 kg/mol to about 500 kg/mol;

(14) Mw/Mn of about 1 to about 40, preferably about 1.4 to about 20, preferably about 1.6 to about 10, preferably about 1.8 to about 3.5, preferably about 1.8 to about 2.5;

(15) branching index (g') of about 0.9 or greater, preferably about 0.95 or greater, preferably about 0.99 or greater; and

(16) melt index (MI) of about 0.1 g/10 min to about 100 g/10 min, preferably about 0.3 g/10 min to about 60 g/10 min, preferably about 0.5 g/10 min to about 40 g/10 min, preferably about 0.7 g/10 min to about 20 g/10 min.

In some embodiments, the ethylene-based elastomers comprise at least 30 wt % of one or more $C_4$-$C_{20}$ olefin comonomers, for example, 1-butene, 1-hexene, and/or 1-octene.

The ethylene-based elastomers may be a random copolymer, a statistical copolymer, a block copolymer, or blends thereof The method of making the ethylene-based elastomer is not critical to this invention, and includes processes such as slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems, or combinations thereof.

Useful ethylene-based elastomers may be produced using a metallocene catalyst system, i.e., a mono- or bis-cyclopentadienyl transition metal catalysts in combination with an activator of alumoxane and/or a non-coordinating anion in solution, slurry, high-pressure, or gas-phase. The catalyst and activator may be supported or unsupported and the cyclopentadienyl rings may be substituted or unsubstituted.

Ethylene-based elastomer useful in the present invention may include those commercially available from ExxonMobil Chemical (sold under the EXACT™ tradename), Dow Chemical (sold under the VERSIFY™, ENGAGE™, and INFUSE™ tradenames), and Mitsui Chemicals (sold under the TAFMER™ tradename).

Propylene-Based Elastomer

In certain preferred embodiments, the polyolefin-based elastomer comprises a propylene-based elastomer. As used herein, a "propylene-based elastomer," used interchangeably herein with "propylene-based copolymer," refers to a random copolymer that is elastomeric and has crystalline regions interrupted by non-crystalline regions. Not intended to be limited by any theory, it is believed that the non-crystalline regions may result from regions of non-crystallizable polypropylene segments and/or the inclusion of comonomer units. The crystallinity and the melting point of the propylene-based elastomers are reduced compared to highly isotactic polypropylene by the introduction of errors (stereo and region defects) in the insertion of propylene and/or by the presence of comonomer. The propylene-based elastomers (or propylene-based copolymers) comprises at least about 60 wt % of propylene-derived units, and about 5 wt % to about 35 wt % of units derived from at least one of ethylene and a $C_4$-$C_{10}$ alpha-olefin, and the propylene-based elastomers have a heat of fusion, as determined by DSC, of about 75 J/g or less.

Useful propylene-based elastomers may contain greater than about 60 wt %, preferably greater than about 65 wt %, more preferably greater than about 75 wt % and up to about 95 wt % propylene-derived units by the weight of the propylene-based elastomer. The propylene-based elastomers may contain greater than about 5 wt %, preferably greater than 7 wt %, more preferably greater than about 9 wt % and up to about 35 wt % ethylene or $C_4$-$C_{10}$ alpha-olefin-derived units, or comonomers, by the weight of the propylene-based elastomers. When more than one comonomer is present, the amount of a particular comonomer may be less than 5 wt %, but the combined comonomer content is greater than 5 wt % based on the total weight of the propylene-based elastomers.

In some embodiments, the propylene-based copolymer includes propylene-derived units in an amount based on the weight of propylene-based copolymer of from about 75 wt % to about 95 wt %, more preferably about 75 wt % to about 92.5 wt %, even more preferably about 82.5 wt % to about 92.5 wt %, and most preferably about 82.5 wt % to about 90 wt %, and correspondingly, the ethylene or $C_4$-$C_{10}$ alpha-olefin-derived units, or comonomers, may be present in an amount based on the weight of propylene-based copolymer of about 5 wt % to about 25 wt %, even more preferably about 7.5 wt % to about 25 wt %, even more preferably about 7.5 wt % to about 20 wt %, even more preferably from about 8 wt % to about 17.5 wt %, and most preferably about 10 wt % to 17.5 wt %.

In some embodiments, the comonomer is ethylene, 1-hexene, or 1-octene, and is preferably present in an amount of about 5 wt % to about 25 wt %, about 5 wt % to about 20 wt %, about 5 wt % to about 16 wt %, about 6 wt % to about 18 wt %, or in some embodiments about 8 wt % to about 20 wt % based on the weight of the propylene-based copolymer.

In some embodiments, the propylene-based copolymer comprises ethylene-derived units. The propylene-based copolymer may comprise about 5 wt % to about 35 wt %, preferably about 5 wt % to about 25 wt %, about 7.5 wt % to about 20 wt %, about 7.5 wt % to about 17.5 wt %, or about 10 wt % to about 17.5 wt %, of ethylene-derived units by weight of the propylene-based copolymer. In some embodiments, the propylene-based copolymer consists essentially of units derived from propylene and ethylene, i.e., the propylene-based copolymer does not contain any other comonomer in an amount greater than that typically present as impurities in the ethylene and/or propylene feedstreams used during polymerization, or in an amount that would materially affect the heat of fusion, melting point, crystallinity, or melt flow rate of the propylene-based copolymer. In some embodiments, the propylene-based copolymer consists essentially of units derived from propylene and ethylene, and no other comonomer is intentionally added to the polymerization process.

In some embodiments, diene comonomer units are included in the propylene-based elastomer. Examples of diene include, but not limited to, 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The amount of diene comonomer is equal to or more than about 0 wt %, or about 0.1 wt %, or about 0.5 wt %, or about 1 wt %, or about 1.5 wt % and lower than, or equal to, about 5 wt %, or about 4 wt %, or about 3 wt %, or about 2 wt % based, on the weight of propylene-based copolymer.

Useful propylene-based elastomers may be described by any number of different parameters, and those parameters may comprise a numerical range made up of any desirable upper limit with any desirable lower limit as described herein.

The propylene-based elastomers may have a heat of fusion ("Hf"), determined according to the Differential Scanning calorimetry ("DSC") procedure described herein, within the range from about 0.5 J/g or about 1 J/g or about 3 J/g or about 5 J/g, to about 35 J/g or about 40 J/g or about 50 J/g or about 65 J/g or about 75 J/g. In certain embodiments, the Hf is less than 75 J/g or 70 J/g or 60 J/g or 50 J/g or 40 J/g.

The propylene-based elastomers may have a triad tacticity of three propylene units, as measured by $^{13}$C NMR, of 75% or greater, 80% or greater, 82% or greater, 85% or greater, or 90% or greater. For example, the triad tacticity may be within the range from 50 to 99%, or from 60 to 99%, or from 75 to 99%, or from 80 to 99%, or from 60 to 97%. Triad tacticity can be determined as follows: The tacticity index, expressed herein as "m/r", is determined by $^{13}$C nuclear magnetic resonance ("NMR") techniques. The tacticity index m/r is calculated as defined by H. N. Cheng, "$^{13}$C NMR Analysis of Ethylene-Propylene Rubbers," in MACROMOLECULES, 17, pp. 1950-1955 (1984), incorporated by reference. The designation "m" or "r" describes the stereochemistry of pairs of contiguous propylene groups, "m" referring to meso and "r" to racemic. An m/r ratio of 1.0 generally describes a syndiotactic polymer and an m/r ratio of 2.0 an atactic material. An isotactic material theoretically may have a ratio approaching infinity, and many by-product atactic polymers have sufficient isotactic content to result in ratios of greater than 50. Embodiments of the propylene-based elastomer have a tacticity index m/r ranging from a lower limit of 4 or 6 to an upper limit of 8 or 10 or 12.

The propylene-based elastomers may have a percent crystallinity within the range from about 2% to about 65%, or from about 3% to about 30%, or from about 5% to about 25%, wherein "percent crystallinity" is determined according to the DSC procedure described herein. The thermal energy for the highest order of polypropylene is estimated at 189 J/g (i.e., 100% crystallinity is equal to 189 J/g). In some embodiments, the propylene-based elastomer has a crystallinity of less than about 40%, or within the range from about 2% to about 25%, or from about 2% to about 22%, or from about 5% to about 20%.

The propylene-based elastomers may have a single peak melting transition as determined by DSC. In certain embodiments, the propylene-based elastomers have a primary peak melting transition at from less than 90° C., with a broad end-of-melt transition at greater than about 110° C. The peak "melting point" ("Tm") is defined as the temperature of the greatest heat absorption within the range of melting of the sample. However, the propylene-based elastomer may show secondary melting peaks adjacent to the principal peak, and/or the end-of-melt transition, but for purposes herein, such secondary melting peaks are considered together as a single melting point, with the highest of these peaks being considered the Tm of the propylene-based elastomer. The propylene-based elastomers may have a peak Tm from less than 105 or 100 or 90 or 80 or 70° C. in certain embodiments; and within the range from 10 or 15 or 20 or 25 to 65 or 75 or 80 or 95 or 105° C. in some embodiments.

Differential scanning calorimetric ("DSC") data can be obtained using a Perkin-Elmer DSC 7. About 5 mg to about 10 mg of a sheet of the polymer to be tested is pressed at approximately 200° C. to 230° C., then removed with a punch die and annealed at room temperature for 48 hours. The samples are then sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) can be calculated using the formula, X %=[area under the curve (Joules/gram)/B(Joules/gram)]*100, where B is the heat of fusion for the homopolymer of the major monomer component. These values for B can be found from the Polymer Handbook, Fourth Edition, published by John Wiley and Sons, New York 1999. A value of 189 J/g (B) is used as the heat of fusion for 100% crystalline polypropylene. The melting temperature is measured and reported during the second heating cycle (or second melt).

The propylene-based elastomers may have a Mooney viscosity [ML (1+4) @ 125° C.], as determined according to ASTM D-1646, of less than about 100, or less than about 75, or less than about 60, or less than about 30.

The propylene-based elastomers may have a density from about 0.840 g/cm$^3$ to about 0.920 g/cm$^3$, or from about 0.845 g/cm$^3$ to about 0.900 g/cm$^3$, or from about 0.850 g/cm$^3$ to about 0.890 g/cm$^3$, as measured at room temperature per ASTM D-1505.

The propylene-based elastomer preferably has a melt flow rate ("MFR") greater than 0.1 g/10 min and less than or equal to about 1,000 g/10 min, or less than or equal to about 800 g/10 min, or less than or equal to about 500 g/10 min, or less than or equal to about 200 g/10 min, or less than or equal to about 100 g/10 min, or less than or equal to about 50 g/10 min. Preferred embodiments include propylene-based copolymers having a MFR of less than or equal to about 25 g/10 min, such as from about 1 to about 25 g/10 min, or from about 1 to about 20 g/10 min. The MFR is determined according to ASTM D-1238, condition L (2.16 kg, 230° C.).

The propylene-based elastomers may have a Shore A hardness, as determined by ISO 868, of from 10 or 20 or 30 or 40 to 80 or 90 or 95 or 100.

The propylene-based elastomers may have an Ultimate Elongation, as determined by ASTM D 412, of greater than about 500% or about 1000% or about 2000%; and preferably from about 500% to about 800% or about 1200% or about 1800% or about 2000% or 3000%.

The propylene-based elastomers may have a weight average molecular weight ("Mw") value of from about 50,000 g/mol to about 1,000,000 g/mol, or from about 60,000 g/mol to about 600,000 g/mol, or from about 70,000 g/mol to about 400,000 g/mol. The propylene-based elastomers may have a number average molecular weight ("Mn") value within the range from about 10,000 g/mol to about 500,000 g/mol, or from about 20,000 g/mol to about 300,000 g/mol, or from about 30,000 g/mol to about 200,000 g/mol. The propylene-based elastomers may have a z-average molecular weight ("Mz") value from about 80,000 g/mol to about 3,000,000 g/mol, or from about 100,000 g/mol to about 700,000 g/mol, or from about 120,000 g/mol to about 500,000 g/mol.

In certain embodiments, a desirable molecular weight (and hence, a desirable MFR) can be achieved by visbreaking the propylene-based elastomer. A "visbroken propylene-based elastomer" (also known in the art as "controlled rheology") is a copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, a visbroken elastomer may be the reaction product of a visbreaking agent and the elastomer. In particular, a visbroken propylene-based elastomer is one that has been treated with a visbreaking agent such that its MFR is increased by at least 10%, or at least 20%, relative to the MFR of the elastomer prior to treatment.

In certain embodiments, the process of making the propylene-based elastomer (or fibers or fabrics comprising the propylene-based elastomer) excludes any visbreaking agents from the extruder and other parts of the apparatus. The propylene-based elastomer in this case is called a "reactor grade" elastomer. By "excludes" or "excluded," what is meant is that visbreaking agents such as peroxides, hydroxylamine esters, oxygen (or air), and other oxidizing and free-radical generating agents are not deliberately added to the extruder or any other component of the forming apparatus downstream of the extruder. Thus, in these embodiments, the elastomer being blown or formed into an article, such as a fiber or fabric, is the elastomer having the desired MFR as introduced into the extruder feeding the article forming apparatus.

The molecular weight distribution ("MWD") of the propylene-based elastomers can be from 1.5 or 1.8 or 2.0 to 3.0 or 3.5 or 4.0 or 5.0. Techniques for determining the molecular weight (Mn, Mz, and Mw) and MWD are as follows, and as in Ver Strate et al., "Near Monodisperse Ethylene-Propylene Copolymers by Direct Ziegler-Natta Polymerization. Preparation, Characterization, Properties," in MACROMOLECULES, Vol. 21, pp. 3360-3371 (1988), incorporated by reference. Conditions described herein govern over published test conditions. Molecular weight and MWD are measured using a Waters 150 gel permeation chromatograph equipped with a Chromatix KMX-6 on-line light scattering photometer. The system is used at 135° C. with 1,2,4-trichlorobenzene as the mobile phase. Showdex™ (Showa-Denko America, Inc.) polystyrene gel columns 802, 803, 804, and 805 can be used. This technique is discussed in Rooney et al., "On Line Determination By Light Scattering of Mechanical Degradation in the GPC Process," LIQUID CHROMATOGRAPHY OF POLYMERS AND RELATED MATERIALS III, pp. 207-235 (J. Cazes ed., Marcel Dekker, 1981), incorporated by reference. No corrections for column spreading are employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn is calculated from an elution time-molecular weight relationship whereas Mz/Mw is evaluated using the light scattering photometer. The numerical analyses can be performed using the commercially available computer software GPC2, MOLWT2 available from LDC/Milton Roy-Riviera Beach, Fla.

This invention is not limited by any particular polymerization method for preparing the propylene-based elastomer. Propylene-based elastomers described herein can be produced using catalysts and/or processes known for producing polypropylene. General process conditions may be found in U.S. Pat. No. 5,001,205, PCT publications WO 96/33227 and WO 97/22639, U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; and 5,677,375, and European publications EP-A-0 794 200, EP-A-0 802 202 and EP-B-634 421, the entire contents of which are incorporated herein by reference.

Preferred propylene-based elastomers are available commercially under the trade names Vistamaxx™ (ExxonMobil Chemical Company, Houston, Tex., USA) and Versify™ (The Dow Chemical Company, Midland, Mich., USA), certain grades of Tafiner™ or is Notio™ (Mitsui Company, Japan), and certain grades of Softel™ (Basell Polyolefins of the Netherlands).

$C_2$-$C_{10}$ Polyolefin

As used herein, a "polyolefin" is a polymer comprising at least about 90 mol %, or at least about 92 mol %, or at least about 95 mol %, or at least about 97 mol %, or at least about 99 mol %, or about 100 mol %, of one or more olefin monomers, preferably α-olefin monomers having 2 to 10 carbon atoms, or 2 to 8 carbon atoms, or 2 to 6 carbon atoms. Useful polyolefins can have a melting point (Tm) generally at least about 110° C., or at least about 120° C., or at least about 130° C., or at least about 140° C. The polyolefin can be elastomeric or non-elastomeric. Preferably, the polyolefin is a $C_2$-$C_{10}$ polyolefin. In certain embodiments, the $C_2$-$C_{10}$ polyolefin may be a homopolymer or a copolymer derived from $C_2$ to $C_{10}$ alpha-olefin monomers including ethylene; propylene; butene-1; pentene-1; 2-methylpentene-1; 3-methylbutene-1; hexene-1; 3-methylpentene-1; 4-methylpentene-1; 3,3-dimethylbutene-1; heptene-1; methylhexene-1; dimethylpentene-1; trimethylbutene-1; ethylpentene-1; octene-1; methylpentene-1; dimethylhexene-1; trimethylpentene-1; ethylhexene-1; methylethylpentene-1; diethylbutene-1; propylpentene-1; decene-1; methylnonene-1; nonene-1; dimethyloctene-1; trimethylheptene-1; ethyloctene-1; methylethylbutene-1; diethylhexene-1; or combinations thereof. In one or more preferred embodiments, the $C_2$-$C_{10}$ polyolefin may comprise polyethylene, polypropylene, or combinations thereof In one or more embodiments, the $C_2$-$C_{10}$ polyolefin can be polypropylene (homopolymer or copolymer), and may have one or more of the following properties:

(1) propylene content of at least about 90 wt %, or at least about 95 wt %, or at least about 97 wt %, or about 100 wt %;

(2) Mw of 30 kg/mol to 2,000 kg/mol, or about 50 kg/mol to about 1,000 kg/mol, or about 90 kg/mol to about 500 kg/mol;

(3) Mw/Mn of about 1 to about 40, or about 1.4 to about 20, or about 1.6 to about 10, or about 1.8 to about 3.5, or about 1.8 to about 2.5;

(4) branching index (g') of about 0.2 to about 2.0, or about 0.5 to about 1.5, or about 0.7 to about 1.3, or about 0.9 to about 1.1;

(5) melt flow rate (MFR) of about 1 g/10 min to about 300 g/10 min, or about 5 g/10 min to about 150 g/10 min, or about 10 g/10 min to about 100 g/10 min, or about 20 g/10 min to about 60 g/10 min;

(6) density of greater than about 0.86 g/cm$^3$, or greater than about 0.89 g/cm$^3$, or is greater than about 0.91 g/cm$^3$, or greater than about 0.93 g/cm$^3$;

(7) crystallization temperature (Tc, peak) of at least about 70° C., or at least about 90° C., or at least about 110° C., or at least about 130° C.;

(8) heat of fusion (Hf) of about 40 J/g to about 160 J/g, or about 50 J/g to 140 J/g, or about 60 J/g to about 120 J/g, or about 80 J/g to about 100 J/g;

(9) crystallinity of greater than about 65%, or greater than about 70%, or greater than about 80%, or greater than about 85%;

(10) propylene meso diads of about 90% or more, or about 92% or more, or about 94% or more, or about 96% or more;

(11) heat deflection temperature (HDT) of about 45° C. to about 140° C., or about 60° C. to about 135° C., or about 75° C. to about 125° C.;

(12) Gardner impact strength at 23° C. of about 30 J to about 1300 J, or about 40 J to about 800 J, or about 50 J to about 600 J; and

(13) flexural modulus of about 300 MPa to about 3000 MPa, or about 600 MPa to about 2500 MPa, or about 800 MPa to about 2000 MPa, or about 1000 MPa to about 1500 MPa.

The polypropylene may be selected from polypropylene homopolymer, polypropylene copolymers, and blends thereof. The homopolymer may be atactic polypropylene, isotactic polypropylene, highly isotactic polypropylene, syndiotactic polypropylene, or blends thereof. The copolymer can be a random copolymer, a statistical copolymer, a block copolymer, or blends thereof.

The method of making the polypropylene is not critical to this invention, and can include processes such as slurry, solution, gas-phase, high-pressure, or other suitable processes, through the use of catalyst systems appropriate for the polymerization of polyolefins, such as Ziegler-Natta-type catalysts, metallocene-type catalysts, other appropriate catalyst systems, or combinations thereof. In preferred embodiments, the propylene polymers are made by the catalysts, activators and processes described in U.S. Pat. Nos. 6,342,566, 6,384,142, WO 03/040201, WO 97/19991, and U.S. Pat. No. 5,741,563. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al., "Selectivity in Propene Polymerization with Metallocene Catalysts," CHEM. REV., 100, pp. 1253-1345 (2000); and I, II METALLOCENE-BASED POLYOLEFINS (Wiley & Sons 2000).

Polypropylene homopolymers or copolymers useful as polyolefins in the present invention may have some level of isotacticity or syndiotacticity. In one embodiment, the polypropylene is isotactic polypropylene, and in another embodiment, the polypropylene is highly isotactic polypropylene. In some embodiments, the polypropylene is a polypropylene homopolymer having at least 85%, or at least 90%, isotactic pentads. In other embodiments, the polypropylene is a polypropylene homopolymer having at least 85%, or at least 90%, syndiotactic pentads.

Polypropylenes useful herein may be produced by a metallocene catalyst system, and have a Mw/Mn of 1.5 to 3, or 1.8 to 2.5, and a CDBI of 80 wt % or more, or 90 wt % or more.

In some embodiments, the propylene polymer is a random copolymer, also known as "RCP," comprising propylene and up to 20 mol % of ethylene or a $C_4$ to $C_{20}$ olefin, or up to 20 mol % ethylene, or from 1 mol % to 10 mol % ethylene.

Useful propylene polymers may include hPP and RCP grades commercially available from many manufacturers, including ExxonMobil Chemical (including hPP grades sold under the ACHIEVE™ tradename), Basell Polyolefins, Borealis, Dow Chemical, Sunoco Chemical, and Total Petrochemicals.

Fillers

In certain embodiments, the powder may comprise fillers. For example, the powder may comprise fillers such as salt derivatives of aromatic or aliphatic hydrocarbon oils, notably metal salts of fatty acids, including metal salts of carboxylic, sulfuric, and phosphoric aliphatic saturated or unsaturated acid having a chain length of 7 to 26 carbon atoms, or 10 to 22 carbon atoms. Examples of suitable fatty acids include the monocarboxylic acids lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, and the like, and the corresponding sulfuric and phosphoric acids. Suitable metals include Li, Na, Mg, Ca, Sr, Ba, Zn, Cd, Al, Sn, Pb and so forth. In one or more embodiments, the additive comprises at least one of a fatty acid metal salt including calcium stearate, zinc stearate, lead stearate, magnesium stearate, aluminum stearate, and combinations thereof.

In certain embodiments, the powder may comprise other fillers including such materials as cellulose, starch, organic pigments such as color concentrates, organic UV-stabilizers, organic heat-stabilizers, organic flame retardants such as halogenated, for instance, bromine containing flame retardants, flour, wood flour, natural fibers, and polymeric fibers like polyester-based, polyamide-based materials, ammonium octamolybdate, and intumescent is compounds.

In certain embodiments, the powder may comprise inorganic fillers, for example, carbon black, talc; graphite; calcium carbonate; glass fibers; marble dust; cement dust; clay; feldspar; silica or glass; fumed silica; alumina; magnesium oxide; antimony oxide; zinc oxide; barium sulfate; silicones calcium sulfate; aluminum silicate; calcium silicate; titanium dioxide; titanates; clay; nanoclay; organo-modified clay or nanoclay; glass microspheres; mica; wollastonite; inorganic pigments; and chalk. Of these inorganic fillers, carbon black, barium sulfate, talc, calcium carbonate, silica/glass, glass fibers, alumina, aluminum trihydroxide, magnesium hydroxide and titanium dioxide, and mixtures thereof are preferred. Of these inorganic fillers, carbon black, talc, calcium carbonate, and combinations thereof are more preferred.

In one or more embodiments, useful fillers may comprise at least one of carbon black, talc, calcium carbonate, calcium stearate, zinc stearate, lead stearate, magnesium stearate, and aluminum stearate. Not to be limited by any theory, it is believed that addition of the above fillers such as fatty acid metal salts may help to improve dispersion of the powder.

Other Additives

As will be evident to those skilled in the art, the powder of the present disclosure may comprise other additives in addition to the fillers as described above. Various additives may be present to enhance a specific property or may be present as a result of processing of the individual components. Additives which may be incorporated include, but are not limited to processing oils, fire retardants, antioxidants, plasticizers, vulcanizing or curative agents, vulcanizing or curative accelerators, cure retarders, tackifying resins, flow improvers, silane coupling agent, and the like. Antiblocking agents, coloring agents, lubricants, mold release agents, nucleating agents, reinforcements, and other fillers (including granular, fibrous, or powder-like) may also be employed. Nucleating agents may improve the rigidity of the article. The list described herein is not intended to be inclusive of all types of other additives which may be employed with the present disclosure. Those of skill in the art will appreciate that other additives may be employed to enhance properties of the polymer composition. As is understood by those skilled in the art, the powder of the present invention may be modified to adjust the characteristics of the powder or composition as desired.

In some embodiments, the powder may comprise process oil in the range of from 0 to 500 parts by weight, or from 2 to 200 parts by weight, or from 5 to 150 parts by weight, or from 10 to 100 parts by weight, per 100 parts of the polyolefin-based elastomers. The addition of process oil in moderate amounts may lower the viscosity and flexibility of the mixture. Adding process oil to the powder may also improve processability and provide a better balance of elastic and tensile strength. The process oil is typically known as extender oil in rubber applications. Process oils include hydrocarbons having either (a) traces of hetero atoms such as oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils are certain organic esters and alkyl ether esters having a molecular weight ("Mn") less than 10,000 g/mol. Combinations of process oils may also be used in the practice of this disclosure. The process oil should be compatible or miscible with the powder in the melt, and may be substantially miscible in the propylene-based elastomer at room temperature. Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference.

In some embodiments, the powder may comprise antioxidants, which may improve the long term aging. Examples of useful antioxidants include, but are not limited to quinolein, e.g., trimethylhydroxyquinolein (TMQ); imidazole, e.g., zincmercapto toluoyl imidazole (ZMTI); and conventional antioxidants, such as hindered phenols, lactones, and phosphites. The amount of antioxidants used may be from 0.001 to 5 parts by weight based on the total weight of the polymer composition.

Powder

Powders of the present invention are prepared such that they have an average particle size and particle size distribution according to the desired use and processing method for articles prepared therefrom. In certain embodiments, the powder may have an average is particle size of less than about 1000 µm, or less than about 850 µm, or from 30 µm to about 850 µm, or from about 350 µm to about 850 µm, or 500 µm to about 850 µm. In certain embodiments, the average particle size may have a minimum size of from about 20 µm, about 25 µm, about 30 µm, about 45 µm, about 75 µm, about 90 µm, about 125 µm, about 180 µm, about 250 µm, about 350 µm, about 500 µm, about 600 µm to a maximum size of about 1000 µm, about 850 µm, about 700 µm, about 600 µm, about 500 µm, about 425 µm, about 350 µm, about 300 µm, about 250 µm, about 210 µm, about 180 µm, about 150 µm, about 125 µm so long as the maximum size is greater than the minimum size. Average particle size and distribution can be measured herein by standard testing sieves according to ASTM E 11-09, in which the nominal size for powders is quantitatively defined by average size and distribution, and powder retained in each sieve and pan is weighed, and calculated, reported as a percentage and compared to a pass/fail criteria.

The powders may comprise a polyolefin-based elastomer having a Shore A hardness of from about 10 to about 95.

In certain embodiments, the powders may comprise from about 10 wt % or about 20 wt % or about 30 wt % or about 40 wt % to about 50 wt % or about 70 wt % or about 80 wt % or about 90 wt % or about 95 wt % or about 100%, based on the weight of the powder, of a polyolefin-based elastomer. In one or more embodiments, the amount of the polyolefin-based elastomers can vary from a minimum amount of about 10 wt %, about 15 wt %, about 25 wt %, about 35 wt %, about 45 wt %, about 55 wt %, about 65 wt %, about 75 wt %, about 85 wt %, about 95 wt %, to a maximum amount of about 100 wt %, about 99 wt %, about 90 wt %, about 80 wt %, about 70 wt %, about 60 wt %, about 50 wt %, about 40 wt %, about 30 wt %, about 20 wt %, as long as the maximum amount is greater than the minimum amount.

In certain embodiments, the powder of the present invention may comprise from about 10 wt % or about 20 wt % or about 30 wt % or about 40 wt % to about 50 wt % or about 70 wt % or about 80 wt % or about 90 wt % or about 95 wt % or about 100%, based on the weight of the powder, of a propylene-based elastomer. In one or more embodiments, the amount of the propylene-based elastomers can vary from a minimum amount of about 10 wt %, about 15 wt %, about 25 wt %, about 35 wt %, about 45 wt %, about 55 wt %, about 65 wt %, about 75 wt %, about 85 wt %, about 95 wt %, to a maximum amount of about 100 wt %, about 99 wt %, about 90 wt %, about 80 wt %, about 70 wt %, about 60 wt %, about 50 wt %, about 40 wt %, about 30 wt %, about 20 wt %, as long as the maximum amount is greater than the minimum amount.

The powder may further comprise a $C_2$-$C_{10}$ polyolefin in an amount of from at is least about 0.1 wt %, or at least about 3 wt %, or at least about 5 wt % up to 99.9 wt %, based on the total weight of the powder depending on different applications. In one or more embodiments, the amount of $C_2$-$C_{10}$ polyolefin may be from about 0.1 wt %, about 0.5 wt %, about 1 wt %, about 5 wt %, about 10 wt %, about 20 wt %, about 40 wt %, about 60 wt %, or about 80 wt % to about 99.9 wt %, about 90 wt %, about 80 wt %, about 70 wt %, about 60 wt %, about 50 wt %, about 40 wt %, about 30 wt %, about 20 wt %, about 15 wt %, or about 10 wt %, so long as the maximum amount of the polyolefin is greater than the minimum amount. Accordingly, in those embodiments where the powder comprises the polyolefin, the amount of polyolefin-based elastomer or the propylene-based elastomer may be from about 0.1 wt %, about 1 wt %, about 5 wt %, about 9 wt %, about 10 wt %, about 15 wt %, about 20 wt %, about 30 wt %, about 40 wt %, about 50 wt %, about 60 wt %, about 70 wt %, or about 80 wt % to about 99.9 wt %, about 99 wt %, about 90 wt %, about 80 wt %, about 60 wt %, about 50 wt %, about 40 wt %, about 30 wt %, about 20 wt %, or about 10 wt %, so long as the maximum content of the polyolefin-based elastomer or the propylene-based elastomer is greater than the minimum content.

The powder may further comprise from about 0.1 wt % to about 85 wt %, or from about 0.1 wt % to about 50 wt %, or from about 0.1 wt % to about 15 wt %, or from about 0.1 wt % to about 10 wt %, or from about 0.5 wt % to about 10 wt %, based on the total weight of the powder of a filler. The maximum amount of filler incorporated in the polymer composition while maintaining the balanced mechanical and physical properties, including tensile strength, flexibility, elongation, dispersion performance, etc., varies from the desired end-use and depends on the type of fillers incorporated into the polymer composition. In one or more embodiments, the amount of the fillers can vary from a minimum amount of about 0.1 wt %, about 0.5 wt %, about 1.0 wt %, about 10 wt %, about 20 wt %, about 30 wt %, about 40 wt %, about 50 wt %, about 60 wt %, about 80 wt %, to a maximum amount of about 85 wt %, about 80 wt %, about 70 wt %, about 65 wt %, about 55 wt %, about 45 wt %, about 35 wt %, about 25 wt %, about 15 wt %, about 10 wt %, about 8 wt %, about 6 wt %, as long as the maximum amount is greater than the minimum amount.

All components including polyolefin-based elastomers, and optionally $C_2$-$C_{10}$ polyolefins and/or fillers of the powder can be first combined in the proportional amount selected according to the desired overall formulation and intended use, and then formed into powders having desired particle size and distribution. While it is not necessary to premix all of the components prior to transformation into powders, the elastomers and the fillers are preferably premixed before transformation into powder. Alternatively, each component can is be first transformed into powders having the desired particle size and distribution, and then combined (e.g., blended) together.

In order to obtain a substantially uniform mixture of the elastomers and optionally polyolefins and/or fillers, blending may occur in the presence of heat and/or pressure. For example, the components may be mixed in an extruder and then exit from the extruder in the form of pellets. The pellets are further transformed into a powder having desired particle size and distribution. The term "transform" or "transformed" herein refers to that a particle is mechanically changed into smaller sized particles.

Commercially available polyolefin-based elastomers, or pellets exiting from the above-described extruder, generally have a pellet size of about 1 mm or more, which is not suitable for rotomoding. Typical pellet-forming technologies, for example, underwater pelletization, see U.S. Pat. No. 5,597,586, are typically not effective to convert the pellets into the powders described herein for applications in rotomolding.

In certain embodiments, cryogenic grinding is a preferred method to form the powders described herein. A cryogenic grinding process comprises embrittling a substance (e.g., an elastomer which may be blended with other components) at low temperatures such as by cooling in liquid carbon dioxide or liquid nitrogen, and then mechanically grinding the embrittled substance into a powder. Preferably, cryogenic grinding is conducted at a temperature of 0° C. to about −200° C. Cryogenic grinding may be conducted at temperatures as low as from −150° C. to absolute zero (−273° C.).

FIG. 1 illustrates an exemplary embodiment of a process for preparation of the powder. Details and variations with respect to the steps and equipment illustrated therein are within the knowledge of those skilled in the art.

Referring to FIG. 1, the raw materials 11, including elastomer and other components such as $C_2$-$C_{10}$ polyolefins and/or fillers and/or other additives, depending upon the specific applications, are mixed in a mixer 12, which could be any type of mixer or blender known in the art, to form a mixture 13. To form an even mixture, more than one mixing step can be repeated in different mixers with different mixing intensities. Mixture 13 is then fed into an extruder 21, for example, a twin-screw extruder. Before feeding into the extruder, the mixture 13 can be run through a screener (not shown) to filter those particular oversized pellets. After extrusion, an extrudate out from the extruder 21 is then cooled in a cooler 22, and pelletized in a pelletizer 23, to form pellets 24. Pellets 24 are then subjected to cryogenic grinding, for example, a Cryogenic Grinding System available from Spectra Cryogenic Systems Pvt. Ltd. Pellets 24 are loaded to a cryogenic screw 31, into which a is liquid nitrogen 41 is introduced to cool the pellets to a subzero temperature, for example, from 0 to about −196° C., or from about −100° C. to about −190° C., and then transferred to a grinding mill 32, for example, a solenoid, to grind cooled pellets 24 into powders 33. Optionally, obtained powders 33 can be further screened (not shown) so as to obtain the powder having desired particle size and distribution.

In certain embodiments, not all components discussed herein are premixed at one time. In these embodiments, the elastomers and optionally some other components can be ground into powders according to the method as described above, and then the powders containing the elastomers are mixed with other components, which are separately ground into powders by any grinding technologies known by a person skilled in the art. In one embodiment, the polyolefin-based elastomer and the filler are premixed and ground into powder which is then combined with a powder of $C_2$-$C_{10}$ polyolefin.

Composition

Also described herein are compositions comprising the above-described powder. In certain embodiments, the composition further comprises a $C_2$-$C_{10}$ polyolefin and/or at least one of carbon black, talc, calcium carbonate, calcium stearate, zinc stearate, lead stearate, magnesium stearate, aluminum stearate, and/or other additives.

Compositions useful for a rotomolding may have an average particle size of less than about 1000 µm, or less than about 850 µm, or from about 30 µm to about 850 µm, or from about 350 µm to about 850 µm, or from about 500 µm to about 850 p.m. In certain embodiments, the average particle size may have a minimum size of from about 20 µm; about 25 µm; about 30 µm; about 45 µm; about 75 µm; about 90 µm; about 125 µm; about 180 µm; about 250 µm; about 350 µm; about 500 µm; about 600 µm, to a maximum size of about 1000 µm; about 850 µm; about 700 µm; about 600 µm; about 500 µm; about 425 µm; about 350 µm; about 300 µm; about 250 µm; about 210 µm; about 180 µm; about 150 µm; about 125 µm, so long as the maximum size is greater than the minimum size.

The compositions may comprise a polyolefin-based elastomer having a Shore A hardness, as determined by ISO 868, of from about 10 to about 95.

In certain embodiments, the compositions comprise from about 10 wt %, or about 20 wt %, or about 30 wt %, or about 40 wt % to about 50 wt %, or about 70 wt %, to about 80 wt %, or about 90 wt %, or about 95 wt %, or about 100%, based on the weight of the composition, of a polyolefin-based elastomer. In one or more embodiments, the amount of the polyolefin-based elastomer can vary from a minimum amount of about 10 wt %, about 15 wt %, about 25 wt %, about 35 wt %, about 45 wt %, about 55 wt %, about 65 wt %, about 75 is wt %, about 85 wt %, about 95 wt %, to a maximum amount of about 100 wt %, about 99 wt %, about 90 wt %, about 80 wt %, about 70 wt %, about 60 wt %, about 50 wt %, about 40 wt %, about 30 wt %, about 20 wt %, as long as the maximum amount is greater than the minimum amount.

In certain embodiments, the compositions may comprise from about 10 wt %, or about 20 wt %, or about 30 wt %, or about 40 wt % to about 50 wt %, or about 70 wt % to about 80 wt %, or about 90 wt %, or about 95 wt %, or about 100%, based on the weight of the composition, of a propylene-based elastomer. In one or more embodiments, the amount of the propylene-based elastomer can vary from a minimum amount of about 10 wt %, about 15 wt %, about 25 wt %, about 35 wt %, about 45 wt %, about 55 wt %, about 65 wt %, about 75 wt %, about 85 wt %, about 95 wt %, to a maximum amount of about 100 wt %, about 99 wt %, about 90 wt %, about 80 wt %, about 70 wt %, about 60 wt %, about 50 wt %, about 40 wt %, about 30 wt %, about 20 wt %, as long as the maximum amount is greater than the minimum amount.

In certain embodiments, the compositions may comprise from about 0.1 wt % to about 85 wt %, based on the total weight of the composition, of a filler. The maximum amount of filler incorporated in the composition, while maintaining the balanced mechanical and physical properties, including tensile strength, flexibility, elongation, dispersion performance, etc., varies depending on the desired end-use and the type of fillers incorporated into the polymer composition. In one or more embodiments, the amount of the fillers can vary from a minimum amount of about 0.1 wt %, about 0.5 wt %, about 1.0 wt %, about 10 wt %, about 20 wt %, about 30 wt %, about 40 wt %, about 50 wt %, about 60 wt %, about 80 wt %, to a maximum amount of about 85 wt %, about 80 wt %, about 70 wt %, about 65 wt %, about 55 wt %, about 45 wt %, about 35 wt %, about 25 wt %, about 15 wt %, about 10 wt %, about 8 wt %, about 6 wt %, as long as the maximum amount is greater than the minimum amount.

In certain embodiments, the composition may further comprise a polyolefin derived from $C_2$-$C_{10}$ alpha-olefin monomer in an amount of from about 0.1 wt % up to 99.9 wt %, based on the total weight of the composition depending on different applications. In one or more embodiments, the amount of polyolefin may be from about 0.1 wt %, about 0.5 wt %, about 1 wt %, about 5 wt %, about 10 wt %, about 20 wt %, about 40 wt %, about 60 wt %, or about 80 wt % to about 99.9 wt %, about 90 wt %, about 80 wt %, about 70 wt %, about 60 wt %, about 50 wt %, about 40 wt %, about 30 wt %, about 20 wt %, about 15 wt %, or about 10 wt %, so long as the maximum amount of the polyolefin is greater than the minimum amount.

Preparation of the composition of the present invention can be any methods known to a person skilled in the art. In certain embodiments, the powder is first made according to the method as described before and then is mixed with other components, which may or may not be ground into powder separately.

Applications

The powders and compositions described herein can be used in forming a variety of articles by a variety of molding processes, for example, extrusion, injection molding, slush molding, etc. Advantageously, articles made of the powders or compositions described herein provide a unique combination of elasticity, flexibility, and toughness. In particular, the powder or the composition can be used in a rotational molding (rotomolding) to form an article having hollow components, including but not limited to, toys; cushion seats; pillows; slides; benches; balls; dolls; bottles; tanks; and boxes. Accordingly, the present invention provides a process for making an article, comprising steps of forming a powder or a composition as described herein, and subjecting the powder or the composition to a rotational molding.

Any known rotational molding process can be used in forming an article comprising the powder or the composition of the present invention, for example, such methods for rotational molding as disclosed in U.S. Pat. Nos. 7,833,460, 7,404,580, U.S. Patent Application Publication No. 20040164457, etc. A rotational molding process generally comprises steps: (a) loading a certain amount of the powder or the composition of the present invention into a mold; (b) heating the mold, for example, in an oven, while it rotates typically on two axes, till all the powder or the composition melt and adhere to the mold wall; (c) cooling the mold, for example, by air fans and/or water sprays, to shrink the article; and (d) release the mold to obtain the article desired. The time and temperature used depend upon factors such as the thickness of article being rotomolded and thermal sensitivity of the constituents, and one skilled in the art can readily determine suitable processing conditions.

For the purpose of the rotational molding, the powder or the composition of the present invention may further comprise a mold release agent (MRA) facilitating the release of the article from the mold. Examples of useful mold release agents include, but are not limited to silicones, and polysiloxane. One skilled in the art can readily determine suitable mold release agents.

Having described the various aspects of the present invention herein, further specific embodiments of the invention include those set forth in the following paragraphs.

Paragraph 1. A powder comprising at least one of:
(a) a propylene-based elastomer comprising, based on the total weight of said propylene-based elastomer, (i) at least about 60 wt % of propylene-derived units, and (ii) about 5 wt % to about 35 wt % of units derived from at least one of ethylene and a $C_4$-$C_{10}$ alpha-olefin, wherein said propylene-based elastomer has a heat of fusion, as determined by DSC, of about 75 J/g or less; and
(b) a polyolefin-based elastomer having a Shore A hardness, as determined by ISO 868, of from about 10 to about 95;
wherein said powder has an average particle size of from about 30 μm to about 850 μM.

Paragraph 2. The powder of Paragraph 1, wherein said powder has an average particle size of about 100 μm to about 500 μm.

Paragraph 3. The powder of Paragraph 1 or 2, wherein said propylene-based elastomer comprises about 82.5 wt % to 92.5 wt % of propylene-derived units based on the weight of said propylene-based elastomer.

Paragraph 4. The powder of any of Paragraphs 1 to 3, wherein said propylene-based elastomer comprises about 7.5 wt % to 17.5 wt % of units derived from at least one of ethylene and a $C_4$-$C_{10}$ alpha-olefin based on the weight of said propylene-based elastomer.

Paragraph 5. The powder of any of Paragraphs 1 to 4, wherein said propylene-based elastomer comprises about 0.01 wt % to about 5 wt % of diene-derived units based on the weight of said propylene-based elastomer.

Paragraph 6. The powder of any of Paragraphs 1 to 5, wherein said propylene-based elastomer further has at least one of:
(i) a melting point, as determined by DSC, of about 110° C. or less;
(ii) a crystallinity, as determined by DSC, of about 2% to about 65% of isotactic polypropylene;
(iii) a melt flow rate, as measured at 230° C. and 2.16 kg weight, of from about 0.1 g/10 min to about 1000 g/10 min; and
(iv) a triad tacticity of propylene, as measured by $^{13}$C NMR, of from about 50% to about 99%.

Paragraph 7. The powder of any of Paragraphs 1 to 5, wherein said propylene-based elastomer further has:
(i) a melting point, as determined by DSC, of about 110° C. or less;
(ii) a crystallinity, as determined by DSC, of about 2% to about 65% of isotactic polypropylene;
(iii) a melt flow rate, as measured at 230° C. and 2.16 kg weight, of from about 0.1 g/10 min to about 1000 g/10 min; and
(iv) a triad tacticity of propylene, as measured by $^{13}$C NMR, of from about 50% to about 99%.

Paragraph 8. The powder of any of Paragraphs 1 to 7, wherein said polyolefin-based elastomer has a Shore A hardness, as determined by ISO 868, of from about 20 to about 85.

Paragraph 9. The powder of any of Paragraphs 1 to 8, wherein the powder comprises at least one of:
(a) a $C_2$-$C_{10}$ polyolefin; and
(b) a carbon black, talc, calcium carbonate, calcium stearate, lead stearate, magnesium stearate, aluminum stearate, or combinations thereof.

Paragraph 10. The powder of any of Paragraphs 1 to 9, wherein the powder comprises about 0.1 wt % to about 99.9 wt % of a $C_2$-$C_{10}$ polyolefin, based on the total weight of said powder.

Paragraph 11. The powder of any of Paragraphs 1 to 10, wherein the powder comprises about 0.1 wt % to about 85 wt % of at least one of carbon black, talc, calcium carbonate, calcium stearate, lead stearate, magnesium stearate, and aluminum stearate, based on the total weight of said powder.

Paragraph 12. The powder of any of Paragraphs 1 to 11, wherein the powder comprises a calcium carbonate, a calcium stearate, or combinations thereof.

Paragraph 13. The powder of any of Paragraphs 9 to 12, wherein said $C_2$-$C_{10}$ polyolefin comprises polypropylene, polyethylene, or combinations thereof.

Paragraph 14. A composition comprising the powder of any of Paragraphs 1 to 13.

Paragraph 15. The composition of Paragraph 14, wherein the composition comprises at least one of:
(a) a $C_2$-$C_{10}$ polyolefin; and
(b) a carbon black, talc, calcium carbonate, calcium stearate, lead stearate, magnesium stearate, aluminum stearate, or combinations thereof.

Paragraph 16. The composition of Paragraph 15, wherein the composition is comprises about 0.1 wt % to about 99.9 wt % based on the total weight of said composition of said $C_2$-$C_{10}$ polyolefin.

Paragraph 17. The composition of Paragraph 15 or 16, wherein the composition comprises about 0.1 wt % to about 85 wt % based on the total weight of said composition of said carbon black, talc, calcium carbonate, calcium stearate, lead stearate, magnesium stearate, aluminum stearate, or combinations thereof.

Paragraph 18. The composition of any of Paragraphs 14 to 17, wherein said composition has an average particle size of about 30 μm to about 850 μm.

Paragraph 19. A process for preparing the powder of any one of Paragraphs 1 to 13 comprising the steps of:
(a) providing the propylene-based elastomer and the polyolefin-based elastomer;
(b) grinding the propylene-based elastomer and the polyolefin-based elastomer.

Paragraph 20. The process of Paragraph 19, wherein step (b) comprises cryogenic grinding.

Paragraph 21. The process of Paragraph 19 or 20, wherein step (a) further comprises cooling the propylene-based elastomer and the polyolefin-based elastomer to a temperature of from about 0° C. to about −273° C.

Paragraph 22. The process of any one of Paragraphs 19 to 21, wherein step (a) further comprises cooling the propylene-based elastomer and the polyolefin-based elastomer to a temperature of from about 0° C. to about −200° C., or from about 0 to −196° C., or from about −100° C. to about −190° C., or from about −150° C. to about −190° C.

Paragraph 23. A process for preparing a powder comprising:
(a) providing a propylene-based elastomer comprising, based on the total weight of said propylene-based elastomer, (i-a) at least about 60 wt % of propylene-derived units, (i-b) about 5 wt % to about 35 wt % of units derived from at least one of ethylene or a $C_4$-$C_{10}$ alpha-olefin, said propylene-based elastomer having a heat of fusion, as determined by DSC, of about 75 J/g or less; and
(b) providing a polyolefin-based elastomer having a Shore A hardness, as determined by ISO 868, of from about 10 to about 95; and
(c) mixing the components provided in steps (a) and (b);
(d) cooling the mixture to a temperature of from about 0 to about −273° C.;
(e) grinding the cooled mixture to form a powder.

Paragraph 24. The process of Paragraph 23, wherein the mixture is cooled to a is temperature of from 0 to about −200° C.

Paragraph 25. The process of Paragraph 23, wherein the mixture is cooled to a temperature of from 0 to 196° C.

Paragraph 26. The process of Paragraph 23, wherein the mixture is cooled to a temperature of from about −100° C. to about −190° C.

Paragraph 27. The Process of Paragraph 23, wherein the mixture is cooled to a temperature of from about −150° C. to about −190° C.

Paragraph 28. A process for preparing a powder comprising the steps of:
(a) providing a composition comprising at least one of:
(i) a propylene-based elastomer comprising, based on the total weight of said propylene-based elastomer, (i-a) at least about 60 wt % of propylene-derived units, (i-b) about 5 wt % to about 35 wt % of units derived from at least one of ethylene or a $C_4$-$C_{10}$ alpha-olefin, said propylene-based elastomer having a heat of fusion, as determined by DSC, of about 75 J/g or less; and
(ii) a polyolefin-based elastomer having a Shore A hardness, as determined by ISO 868, of from about 10 to about 95; and
(b) forming a powder from the composition, wherein said powder has an average particle size of about 30 μm to about 850 μm.

Paragraph 29. The process of Paragraph 28, wherein step (b) comprises cryogenic grinding.

Paragraph 30. The process of Paragraph 28 or 29, wherein step (a) further comprises cooling the propylene-based elastomer and/or the polyolefin-based elastomer to a temperature of from about 0° C. to about −273° C., or from about 0° C. to about −200° C., or from about 0 to −196° C., or from about −100° C. to about −190° C., or from about −150° C. to about −190° C.

Paragraph 31. The process of Paragraph 28 or 30, wherein step (a) further comprises providing at least one of:

(iii) $C_2$-$C_{10}$ polyolefin; and
(iv) a carbon black, talc, calcium carbonate, calcium stearate, lead stearate, magnesium stearate, aluminum stearate, or combinations thereof.

Paragraph 32. A process for preparing a powder comprising the steps of:
(a) providing a propylene-based elastomer comprising, based on the total weight of said propylene-based elastomer, (i-a) at least about 60 wt % of propylene-derived units, (i-b) about 5 wt % to about 35 wt % of units derived from at least one of ethylene or a $C_4$-$C_{10}$ alpha-olefin, and said propylene-based elastomer having a heat of fusion, as determined by DSC, of about 75 J/g or less; and
(b) providing a polyolefin-based elastomer having a Shore A hardness, as determined by ISO 868, of from about 10 to about 95, and
(b) cryogenically grinding the components of steps (a) and (b) into powder.

Paragraph 33. The process of Paragraph 32, wherein said powder has an average particle size of about 30 μm to about 850 μm.

Paragraph 34. The process of any one of Paragraphs 32 to 33, wherein steps (a) and (b) further comprises cooling the propylene-based elastomer and the polyolefin-based elastomer to a temperature of from about 0° C. to about −200° C., or from about 0 to −196° C., or from about −100° C. to about −190° C., or from about −150° C. to about −190° C.

Paragraph 35. A process for preparing a composition comprising the step of:
(a) preparing a powder according to the process of any of Paragraphs 19 to 34; and
(b) forming the composition by combining said powder with at least one of:
(i) a $C_2$-$C_{10}$ polyolefin; and
(ii) a carbon black, talc, calcium carbonate, calcium stearate, lead stearate, magnesium stearate, aluminum stearate, or combinations thereof, to form said composition.

Paragraph 36. An article made from the powder of any of Paragraphs 1 to 13, or the composition of any of Paragraphs 14 to 18.

Paragraph 37. The article of Paragraph 36, wherein said article comprises a hollow component.

Paragraph 38. The article of Paragraph 35 or 36, wherein said article is a toy, cushion, seat, pillow, slide, bench, ball, doll, bottle, tank, or box.

Paragraph 39. A process for preparing an article comprising the steps of:
(a) preparing the powder of any of Paragraphs 1 to 13 and/or the composition of any of Paragraphs 14 to 18; and
(b) subjecting said powder and/or the composition to rotational molding.

EXAMPLES

Materials

Component A: Vistamaxx™ 6202 polyolefin-based elastomer, commercially available from ExxonMobil Chemical Company (TX, USA), containing 15 wt % of ethylene and the balance propylene, having a heat of fusion, as determined by DSC, of 12 J/g, a Shore A hardness, as determined by ASTM 220 of 61 (15 sec, 23° C.), a melting point, as determined is by DSC, of 94° C., a melt flow rate of 18 g/10 min (230° C., 2.16 kg).

Component B: Vistamaxx™ 3020 propylene-based elastomer, commercially available from ExxonMobil Chemical Company (TX, USA), containing 10.5 wt % of ethylene and remaining propylene, having a heat of fusion, as determined by DSC, of 31 J/g, a Shore A hardness, as determined by ASTM 220 of 85 (15 sec, 23° C.), a melting point, as determined by DSC, of 65° C., a melt flow rate of 2.2 g/10 min.

Component C: PP9074MED propylene random copolymer, commercially available from ExxonMobil Chemical Company (TX, USA).

Preparation of Powder

Components as shown in Table 1 were blended in a Banbury mixer, and then run through a double screw extruder, and then subjected to a cryogenic grinding system available from Spectra Cryogenic Systems Pvt. Ltd. The resulting powder has a particle size of less than 800 μm.

TABLE 1

Compositions and particle size of powder

| Example No. | Component A (wt %) | Component B (wt %) | Component C (wt %) | Particle Size less than 800 μm (%) |
|---|---|---|---|---|
| 1 | 100 | | | 100% |
| 2 | | 100 | | 100% |
| 3 | 95 | | 5 | 100% |
| 4 | 90 | | 10 | 100% |
| 5 | 85 | | 15 | 100% |
| 6 | 80 | | 20 | 100% |

Preparation of Article

The obtained powders from Examples 1-7, as well as Comparative Example I (unground pellets of Component B) were sprinkled in a tin pan (sizes: 2" deep×8" long×4' wide) and then set in an oven at an about 45° angle. The oven was pre-set at 3 temperatures, 125° C., 135° C., and 150° C. It was observed that all of the powders flowed and covered the bottom of the tin pan, indicating that those powders are useful in a rotomolding process.

The articles were then released from the tin pan, and the appearance of the articles was observed. Results are shown in Table 2.

TABLE 2

| Example No. | Bubbles | Voids |
|---|---|---|
| Comparative I | Yes | Yes |
| 1 | Yes | No |
| 2 | Yes | No |
| 3 | No | No |
| 4 | No | No |
| 5 | No | No |
| 6 | No | No |

All patents, patent applications, test procedures, priority documents, articles, publications, manuals, and other documents cited herein are fully incorporated by reference is for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims appended hereto be limited to the examples and descriptions set forth herein, but rather that the claims be construed as encompassing all the features of patentable novelty which reside in the present invention, including all features which would be treated as equivalents thereof by those skilled in the art to which the invention pertains.

What we claim:

1. A powder comprising at least one of:
   (a) a propylene-based elastomer comprising, based on the total weight of said propylene-based elastomer, (i) at least about 60 wt % of propylene-derived units, (ii) about 5 wt % to about 35 wt % of units derived from at least one of ethylene and a $C_4$-$C_{10}$ alpha-olefin, wherein said propylene-based elastomer has a heat of fusion, as determined by DSC, of about 75 J/g or less; and
   (b) a polyolefin-based elastomer having a Shore A hardness, as determined by ISO 868, of from about 10 to about 95;
   wherein said powder has an average particle size of from about 30 μm to about 850 μm.

2. The powder of claim 1, wherein said powder has an average particle size of about 100 μm to about 500 μm.

3. The powder of claim 1, wherein said propylene-based elastomer comprises about 82.5 wt % to about 92.5 wt % of propylene-derived units based on the weight of said propylene-based elastomer.

4. The powder of claim 1, wherein said propylene-based elastomer comprises about 7.5 wt % to about 17.5 wt % of units derived from at least one of ethylene and a $C_4$-$C_{10}$ alpha-olefin based on the weight of said propylene-based elastomer.

5. The powder of claim 1, wherein said propylene-based elastomer comprises about 0.01 wt % to about 5 wt % of diene-derived units based on the weight of said propylene-based elastomer.

6. The powder of claim 1, wherein said propylene-based elastomer has at least one of:
   (i) a melting point, as determined by DSC, of about 110° C. or less;
   (ii) a crystallinity, as determined by DSC, of about 2% to about 65% of isotactic polypropylene;
   (iii) a melt flow rate, as measured at 230° C. and 2.16 kg weight, of from about 0.1 g/10 min to about 1000 g/10 min; and
   (iv) a triad tacticity of propylene, as measured by $^{13}C$ NMR, of from about 50% to about 99%.

7. The powder of claim 1, wherein said polyolefin-based elastomer has a Shore A hardness, as determined by ISO 868, of from about 20 to about 85.

8. A composition comprising the powder of claim 1.

9. A process for preparing an article comprising the steps of:
   (a) preparing the powder of claim 1; and
   (b) subjecting said powder to rotational molding.

10. The powder of claim 1, wherein the powder further comprises at least one of:
    (c) a $C_2$-$C_{10}$ polyolefin; and
    (d) a carbon black, talc, calcium carbonate, calcium stearate, lead stearate, magnesium stearate, aluminum stearate, or combinations thereof.

11. The powder of claim 10, wherein the powder comprises about 0.1 wt % to about 99.9 wt % of a $C_2$-$C_{10}$ polyolefin, based on the total weight of said powder.

12. The power of claim 10, wherein the powder comprises about 0.1 wt % to about 85 wt % of at least one of carbon black, talc, calcium carbonate, calcium stearate, lead stearate, magnesium stearate, and aluminum stearate, based on the total weight of said powder.

13. The powder of claim 10, wherein said $C_2$-$C_{10}$ polyolefin comprises polypropylene, polyethylene, or combinations thereof.

14. An article made from the powder of claim 1.

15. The article of claim 14, wherein said article comprises a hollow component.

16. The article of claim 15, wherein said article is a toy, cushion, seat, pillow, slide, bench, ball, doll, bottle, tank, or box.

17. A process for preparing a powder comprising the steps of:
(a) providing a composition comprising at least one of:
  (i) a propylene-based elastomer comprising, based on the total weight of said propylene-based elastomer, (i-a) at least about 60 wt % of propylene-derived units, (i-b) about 5 wt % to about 35 wt % of units derived from at least one of ethylene or a $C_4$-$C_{10}$ alpha-olefin, said propylene-based elastomer having a heat of fusion, as determined by DSC, of about 75 J/g or less; and
  (ii) a polyolefin-based elastomer having a Shore A hardness, as determined by ISO 868, of from about 10 to about 95; and
(b) forming a powder from the composition, wherein said powder has an average particle size of about 30 μm to about 850 μm.

18. The process of claim 17, wherein step (b) comprises cryogenic grinding.

19. The process of claim 17, wherein step (a) further comprises cooling the propylene-based elastomer and/or the polyolefin-based elastomer to a temperature of from about 0° C. to about −273° C.

20. The process of claim 17, wherein step (a) further comprises providing at least one of:
(i) $C_2$-$C_{10}$ polyolefin; and
(ii) a carbon black, talc, calcium carbonate, calcium stearate, lead stearate, magnesium stearate, aluminum stearate, or combinations thereof.

21. A process for preparing a powder comprising:
(a) providing a propylene-based elastomer comprising, based on the total weight of said propylene-based elastomer, (i-a) at least about 60 wt % of propylene-derived units, (i-b) about 5 wt % to about 35 wt % of units derived from at least one of ethylene or a $C_4$-$C_{10}$ alpha-olefin, said propylene-based elastomer having a heat of fusion, as determined by DSC, of about 75 J/g or less; and
(b) providing a polyolefin-based elastomer having a Shore A hardness, as determined by ISO 868, of from about 10 to about 95; and
(c) mixing the components provided in steps (a) and (b);
(d) cooling the mixture to a temperature of from about 0 to about −273° C.;
(e) grinding the cooled mixture to form a powder.

22. The process of claim 21, wherein said powder has an average particle size of about 30 μm to about 850 μm.

23. The process of claim 21, wherein step (d) comprises cooling the mixture to a temperature of from about 0° C. to about −200° C.

24. A process for preparing a composition comprising the step of:
(a) preparing a powder according to the process of claim 21; and
(b) forming a composition by combining said powder with at least one of:
  (i) a $C_2$-$C_{10}$ polyolefin; and
  (ii) a carbon black, talc, calcium carbonate, calcium stearate, lead stearate, magnesium stearate, aluminum stearate, or combinations thereof.

* * * * *